United States Patent
Sato et al.

(10) Patent No.: US 11,435,714 B2
(45) Date of Patent: Sep. 6, 2022

(54) INFORMATION PROCESSING DEVICE, CONTROL METHOD, AND RECORDING MEDIUM FOR SPECIFYING RELATED EVENT FROM COLLECTED EVENT LOGS

(71) Applicant: OMRON Corporation, Kyoto (JP)

(72) Inventors: Kenji Sato, Kusatsu (JP); Ziqiang Xu, Kusatsu (JP); Hirohito Mizumoto, Otsu (JP); Hajime Ujiie, Takatsuki (JP); Atsushi Kamimura, Kusatsu (JP)

(73) Assignee: OMRON Corporation, Kyoto (JP)

( * ) Notice: Subject to any disclaimer, the term of this patent is extended or adjusted under 35 U.S.C. 154(b) by 698 days.

(21) Appl. No.: 16/470,540

(22) PCT Filed: Oct. 20, 2017

(86) PCT No.: PCT/JP2017/038073
§ 371 (c)(1),
(2) Date: Jun. 17, 2019

(87) PCT Pub. No.: WO2018/142688
PCT Pub. Date: Aug. 9, 2018

(65) Prior Publication Data
US 2020/0089179 A1 Mar. 19, 2020

(30) Foreign Application Priority Data
Jan. 31, 2017 (JP) .............................. JP2017-016235

(51) Int. Cl.
*G05B 19/048* (2006.01)
*G05B 23/02* (2006.01)

(52) U.S. Cl.
CPC ....... *G05B 19/048* (2013.01); *G05B 23/0272* (2013.01); *G05B 2219/2231* (2013.01)

(58) Field of Classification Search
CPC .............. G05B 19/048; G05B 23/0272; G05B 2219/2231
See application file for complete search history.

(56) References Cited

U.S. PATENT DOCUMENTS

2003/0149800 A1* 8/2003 Bouchet .............. G06F 11/3476
719/318
2013/0110263 A1 5/2013 Schulze et al.
(Continued)

FOREIGN PATENT DOCUMENTS

CN 101610174 12/2009
CN 105320054 2/2016
(Continued)

OTHER PUBLICATIONS

"International Search Report (Form PCT/ISA/210) of PCT/JP2017/038073," dated Dec. 26, 2017, with English translation thereof, pp. 1-2.
(Continued)

*Primary Examiner* — Glenn A. Auve
(74) *Attorney, Agent, or Firm* — JCIPRNET (57) ABSTRACT

The purpose of the present invention is to enable even an unskilled person to easily identify a related event in a short time from a collected event log. A system management device (1) is provided with: a display control part (32) for causing a display part (14) to display an event log; an identification part (30) for identifying an event of interest log specified by a user through an operation part (11); and an extraction part (31) for extracting a related event log related to an event of interest from an event log database (20). The display control part (32) causes the display part (14) to display the event of interest log and the related event log.

9 Claims, 9 Drawing Sheets

(56) References Cited

U.S. PATENT DOCUMENTS

| | | | | |
|---|---|---|---|---|
| 2013/0176133 | A1* | 7/2013 | Phelps | G05B 23/0272 |
| | | | | 340/679 |
| 2015/0378773 | A1* | 12/2015 | Nagata | G05B 19/05 |
| | | | | 718/100 |
| 2016/0373293 | A1* | 12/2016 | Kushmerick | H04L 41/0613 |
| 2017/0068229 | A1* | 3/2017 | Yaoita | G06F 11/32 |
| 2017/0255192 | A1* | 9/2017 | Thwaites | G05B 23/0289 |
| 2018/0224809 | A1* | 8/2018 | Liu | G05B 19/4183 |

FOREIGN PATENT DOCUMENTS

| | | |
|---|---|---|
| CN | 106062722 | 10/2016 |
| EP | 2613211 | 7/2013 |
| FR | 2835629 | 8/2003 |
| JP | 2010244116 | 10/2010 |
| JP | 2013003203 | 1/2013 |
| JP | 2014235710 | 12/2014 |
| JP | 2016012172 | 1/2016 |
| JP | 2016146014 | 8/2016 |
| WO | 2002061514 | 6/2004 |
| WO | 2007096959 | 8/2007 |

OTHER PUBLICATIONS

"Written Opinion of the International Searching Authority (Form PCT/ISA/237) of PCT/JP2017/038073," dated Dec. 26, 2017, with English translation thereof, pp. 1-8.
"Search Report of Europe Counterpart Application", dated Aug. 7, 2020, p. 1-p. 9.
"Office Action of China Counterpart Application" with English translation thereof, dated Aug. 11, 2021, p. 1-p. 19.

* cited by examiner

| Entry no. | Date and time | Importance | Occurrence source | Occurrence source details | Event name | Event code |
|---|---|---|---|---|---|---|
| 0663 | 2016/10/13 19:14:39 | All stop fault | Master device 3 | | Task execution timeout | 0x01 |
| 0648 | 2016/10/13 19:12:15 | Light fault | Network | Node 2 (Slave device 4a) | Process data communication abnormality | 0x06 |
| 0647 | 2016/10/13 19:12:14 | Light fault | Network | Node 2 (Slave device 4a) | Slave application abnormality | 0x*** |
| 0574 | 2016/10/13 18:58:38 | Light fault | Network | Node 2 (Slave device 4a) | Process data communication abnormality | 0x06 |
| 0509 | 2016/10/13 18:48:31 | Monitoring information | Master device 3 | | Backup execution failure | 0x*** |
| 0508 | 2016/10/13 18:48:31 | Monitoring information | Network | Node 7 (Slave device 4a) | Backup execution failure (Slave device 4a) | 0x*** |
| 0349 | 2016/10/13 18:19:44 | Light fault | Network | Node 7 (Slave device 4a) | Network configuration collation abnormality | 0x03 |
| 0333 | 2016/10/13 18:18:24 | General information | Master device 3 | | Power on | 0x*** |
| 0331 | 2016/10/13 18:17:53 | General information | Master device 3 | | Power off | 0x*** |
| 0328 | 2016/10/13 18:16:26 | All stop fault | Master device 3 | | PLC system process abnormality | 0x02 |
| 0327 | 2016/10/13 18:16:15 | All stop fault | Master device 3 | | Lack of system service time | 0x05 |
| 0326 | 2016/10/13 18:16:13 | All stop fault | Master device 3 | | PLC function process abnormality | 0x04 |
| 0325 | 2016/10/13 18:16:13 | All stop fault | Master device 3 | | Task execution timeout | 0x01 |
| 0320 | 2016/10/13 18:15:06 | Light fault | Network | Node 7 (Slave device 4a) | Network configuration collation abnormality | 0x03 |
| 0276 | 2016/10/13 17:38:46 | Monitoring information | Master device 3 | | Backup execution failure | 0x*** |
| 0275 | 2016/10/13 17:38:46 | Monitoring information | Network | Master device 3 | Backup execution failure (Slave device 4a) | 0x*** |
| 0273 | 2016/10/13 17:38:41 | Partial stop fault | Network | Communication port | Link-off abnormality | 0x*** |
| 0271 | 2016/10/13 17:22:54 | Monitoring information | Master device 3 | | Backup execution failure | 0x*** |
| 0270 | 2016/10/13 17:22:54 | Monitoring information | Network | Master device 3 | Backup execution failure (Slave device 4a) | 0x*** |
| 0268 | 2016/10/13 17:22:50 | Partial stop fault | Network | Communication port | Link-off abnormality | 0x*** |
| 0266 | 2016/10/13 17:21:51 | Monitoring information | Master device 3 | | Backup execution failure | 0x*** |
| 0265 | 2016/10/13 17:21:50 | Monitoring information | Network | Master device 3 | Backup execution failure (Slave device 4a) | 0x*** |
| 0263 | 2016/10/13 17:21:46 | Partial stop fault | Network | Communication port | Link-off abnormality | 0x*** |
| 0261 | 2016/10/13 17:17:12 | Monitoring information | Master device 3 | | Backup execution failure | 0x*** |
| 0260 | 2016/10/13 17:17:12 | Monitoring information | Network | Master device 3 | Backup execution failure (Slave device 4a) | 0x*** |
| 0258 | 2016/10/13 17:17:08 | Partial stop fault | Network | Communication port | Link-off abnormality | 0x*** |
| 0255 | 2016/10/13 17:12:31 | Light fault | Network | Node 2 (Slave device 4a) | Process data communication abnormality | 0x06 |
| 0254 | 2016/10/13 17:12:02 | General information | Master device 3 | | Power on | 0x*** |
| 0253 | 2016/10/13 17:11:38 | General information | Master device 3 | | Power off | 0x*** |
| 0252 | 2016/10/13 17:11:17 | Light fault | Network | Node 5 (Slave device 4a) | Network configuration collation abnormality | 0x03 |
| 0249 | 2016/10/13 16:31:39 | Light fault | Network | Node 2 (Slave device 4a) | Process data communication abnormality | 0x06 |
| 0248 | 2016/10/13 16:30:24 | Light fault | Network | Node 5 (Slave device 4a) | Network configuration collation abnormality | 0x03 |
| 0741 | 2016/10/13 16:15:32 | Light fault | Network | Node 2 (Slave device 4a) | Process data communication abnormality | 0x06 |

| Event code | Event name | Relevant device |
|---|---|---|
| 0x01 | Task execution timeout | Master device 3 |
| 0x02 | PLC system process abnormality | Master device 3 |
| 0x03 | Network configuration collation abnormality | Slave device 4a |
| 0x04 | PLC function process abnormality | Master device 3 |
| 0x05 | Lack of system service time | All devices |
| 0x06 | Process data communication abnormality | Slave device 4a |
| ... | | |

FIG. 4B

| Boundary event | Relevant device |
|---|---|
| Power on | Master device 3 |
| Restart execution | Slave device 4a |
| Power on | Attached slave device 4b |
| ... | |

FIG. 4C

| | Attention event | | Relevant event | |
|---|---|---|---|---|
| | Event code | Event name | Event code | Event name |
| Rule 1 | 0x01 | Task execution timeout | 0x03 | Network configuration collation abnormality |
| Rule 2 | 0x02 | PLC system process abnormality | 0x04 | PLC function process abnormality |
| Rule 3 | 0x02 | PLC system process abnormality | 0x01 | Task execution timeout |
| Rule 4 | 0x02 | PLC system process abnormality | 0x05 | Lack of system service time |
| Rule 5 | 0x02 | PLC system process abnormality | 0x06 | Process data communication abnormality |
| ... | | | | |

FIG. 5

| Entry no. | Date and time | Importance | Occurrence source | Occurrence source details | Event name | Event code |
|---|---|---|---|---|---|---|
| 0663 | 2016/10/13 19:14:39 | All stop fault | Master device 3 | | Task execution timeout | 0x01 |
| 0648 | 2016/10/13 19:12:15 | Light fault | Network | Node 2 (Slave device 4a) | Process data communication abnormality | 0x06 |
| 0647 | 2016/10/13 19:12:14 | Light fault | Network | Node 2 (Slave device 4a) | Slave application abnormality | 0x** |
| 0574 | 2016/10/13 18:58:38 | Light fault | Network | Node 2 (Slave device 4a) | Process data communication abnormality | 0x06 |
| 0509 | 2016/10/13 18:48:31 | Monitoring information | Master device 3 | | Backup execution failure | 0x** |
| 0508 | 2016/10/13 18:48:31 | Monitoring information | Network | Node 7 (Slave device 4a) | Backup execution failure (Slave device 4a) | 0x** |
| 0349 | 2016/10/13 18:19:44 | Light fault | Network | Node 7 (Slave device 4a) | Network configuration collation abnormality | 0x03 |
| 0333 | 2016/10/13 18:18:24 | General information | Master device 3 | | Power on | 0x** |
| 0331 | 2016/10/13 18:17:53 | General information | Master device 3 | | Power off | 0x** |
| 0328 | 2016/10/13 18:16:26 | All stop fault | Master device 3 | | PLC system process abnormality | 0x02 |
| 0327 | 2016/10/13 18:16:15 | All stop fault | Master device 3 | | Lack of system service time | 0x05 |
| 0326 | 2016/10/13 18:16:13 | All stop fault | Master device 3 | | PLC function process abnormality | 0x04 |
| : | : | : | : | : | : | : |

FIG. 6

| Entry no. | Date and time | Importance | Occurrence source | Occurrence source details | Event name | Event code |
|---|---|---|---|---|---|---|
| ⋮ | ⋮ | ⋮ | ⋮ | ⋮ | ⋮ | ⋮ |
| 0331 | 2016/10/13 18:17:53 | General information | Master device 3 | | Power off | 0x** |
| 0328 | 2016/10/13 18:16:26 | All stop fault | Master device 3 | | PLC system process abnormality | 0x02 |
| 0327 | 2016/10/13 18:16:15 | All stop fault | Master device 3 | | Lack of system service time | 0x05 |
| 0326 | 2016/10/13 18:16:13 | All stop fault | Master device 3 | | PLC function process abnormality | 0x04 |
| 0325 | 2016/10/13 18:16:13 | All stop fault | Master device 3 | | Task execution timeout | 0x01 |
| 0320 | 2016/10/13 18:15:06 | Light fault | Network | Node 7 (Slave device 4a) | Network configuration collation abnormality | 0x03 |
| 0276 | 2016/10/13 17:38:46 | Monitoring information | Master device 3 | | Backup execution failure | 0x** |
| 0275 | 2016/10/13 17:38:46 | Monitoring information | Network | Master device 3 | Backup execution failure (Slave device 4a) | 0x** |
| 0273 | 2016/10/13 17:38:41 | Partial stop fault | Network | Communication port | Link-off abnormality | 0x** |
| 0271 | 2016/10/13 17:22:54 | Monitoring information | Master device 3 | | Backup execution failure | 0x** |
| 0270 | 2016/10/13 17:22:54 | Monitoring information | Network | Master device 3 | Backup execution failure (Slave device 4a) | 0x** |
| 0268 | 2016/10/13 17:22:50 | Partial stop fault | Network | Communication port | Link-off abnormality | 0x** |
| 0266 | 2016/10/13 17:21:51 | Monitoring information | Master device 3 | | Backup execution failure | 0x** |
| 0265 | 2016/10/13 17:21:50 | Monitoring information | Network | Master device 3 | Backup execution failure (Slave device 4a) | 0x** |
| 0263 | 2016/10/13 17:21:46 | Partial stop fault | Network | Communication port | Link-off abnormality | 0x** |
| 0261 | 2016/10/13 17:17:12 | Monitoring information | Master device 3 | | Backup execution failure | 0x** |
| 0260 | 2016/10/13 17:17:12 | Monitoring information | Network | Master device 3 | Backup execution failure (Slave device 4a) | 0x** |
| 0258 | 2016/10/13 17:17:08 | Partial stop fault | Network | Communication port | Link-off abnormality | 0x** |
| 0255 | 2016/10/13 17:12:31 | Light fault | Network | Node 2 (Slave device 4a) | Process data communication abnormality | 0x** |
| 0254 | 2016/10/13 17:12:02 | General information | Master device 3 | | Power on | 0x06 |
| 0253 | 2016/10/13 17:11:38 | General information | Master device 3 | | Power off | 0x** |
| 0252 | 2016/10/13 17:11:17 | Light fault | Network | Node 5 (Slave device 4a) | Network configuration collation abnormality | 0x03 |
| 0249 | 2016/10/13 16:31:39 | Light fault | Network | Node 2 (Slave device 4a) | Process data communication abnormality | 0x06 |
| 0248 | 2016/10/13 16:30:24 | Light fault | Network | Node 5 (Slave device 4a) | Network configuration collation abnormality | 0x03 |
| 0741 | 2016/10/13 16:15:32 | Light fault | Network | Node 2 (Slave device 4a) | Process data communication abnormality | 0x06 |
| ⋮ | ⋮ | ⋮ | ⋮ | ⋮ | ⋮ | ⋮ |

| Entry no. | Date and time | Importance | Occurrence source | Occurrence source details | Event name | Event code |
|---|---|---|---|---|---|---|
| 0328 | 2016/10/13 18:16:26 | All stop fault | Master device 3 | | PLC system process abnormality | 0x02 |
| 0327 | 2016/10/13 18:16:15 | All stop fault | Master device 3 | | Lack of system service time | 0x05 |
| 0326 | 2016/10/13 18:16:13 | All stop fault | Master device 3 | | PLC function process abnormality | 0x04 |
| 0325 | 2016/10/13 18:16:13 | All stop fault | Master device 3 | | Task execution timeout | 0x01 |

FIG. 9

INFORMATION PROCESSING DEVICE, CONTROL METHOD, AND RECORDING MEDIUM FOR SPECIFYING RELATED EVENT FROM COLLECTED EVENT LOGS

CROSS-REFERENCE TO RELATED APPLICATION

This application is a 371 of international application of PCT application serial no. PCT/JP2017/038073, filed on Oct. 20, 2017, which claims the priority benefit of Japan application no. 2017-016235, filed on Jan. 31, 2017. The entirety of each of the above-mentioned patent applications is hereby incorporated by reference herein and made a part of this specification.

TECHNICAL FIELD

The present invention relates to an information processing device that processes information collected by a master device in a master-slave control system.

BACKGROUND ART

In the related art, many industrial network systems including slave devices that perform data collection and control of production equipment installed in a factory or the like and a master device that centrally manages the plurality of slave devices have been devised. In an industrial network system, a master device collects many event logs from a plurality of slave devices that it manages. The collected event logs are used for a user to ascertain the occurrence cause when a predetermined event occurs in the system.

CITATION LIST

Patent Literature

[Patent Literature 1]
PCT International Publication No. WO2002/061514 (international publication on 8 Aug. 2002)
[Patent Literature 2]
Japanese Patent Application Laid-open No. 2013-3203 (publication on 7 Jan. 2013)
[Patent Literature 3]
Japanese Patent Application Laid-open No. 2014-235710 (publication on 15 Dec. 2014)

SUMMARY OF INVENTION

Problem to be Solved by the Invention

However, in the above-described technologies of the related art, the collected event logs become considerably vast. Therefore, general users who are not experienced persons, learned persons, or the like familiar with the foregoing systems (hereinafter referred to as unskilled persons) take much time to analyze event logs or may be unable to analyze event logs. In cases in which several events are complicatedly related to one another, it is more difficult or nearly impossible for an unskilled person to specify a basic event that is the true cause of all the events. In this way, there is the problem that it is considerably difficult for an unskilled person to specify other events related to a certain attention event from a vast number of event logs.

An object of an aspect of the present invention is to provide an information processing device or the like capable of allowing even an unskilled person to specify a related event easily in a short time from collected event logs.

Means to Solve the Problem

To solve the foregoing problem, according to an aspect of the present invention, there is provided an information processing device which processes an event log for recording a predetermined event occurring in a master-slave control system and collected by a master device, in which the event log at least includes information indicating content of an occurring event and is stored in a log storage part for each event. The information processing device includes: a display control part configured to cause a display part to display one or more event logs; a specifying part configured to specify an event log designated by a user via an operation part among the displayed event logs as an attention event log; and an extraction part configured to specify a relevant event relevant to an attention event recorded in the attention event log based on a predetermined rule and extract a relevant event log in which occurrence of the relevant event is recorded from the log storage part. The display control part causes the display part to display the attention event log and the extracted relevant event log.

To solve the foregoing problem, according to another aspect of the present invention, there is provided a method of controlling an information processing device which processes an event log for recording a predetermined event occurring in a master-slave control system and collected by a master device, in which the event log at least includes information indicating content of the occurring event and is stored in a log storage part for each event, and the information processing device includes a display part and an operation part. The method includes: a first display control step of causing the display part to display one or more event logs; a specifying step of specifying an event log designated by a user via the operation part among the displayed event logs as an attention event log; an extraction step of specifying a relevant event relevant to an attention event recorded in the attention event log based on a predetermined rule and extracting a relevant event log in which occurrence of the relevant event is recorded from the log storage part; and a second display control step of causing the display part to display the attention event log and the extracted relevant event log.

Effects of Invention

According to an aspect of the present invention, it is possible to allow even an unskilled person to specify a related event log easily in a short time from collected event logs.

BRIEF DESCRIPTION OF DRAWINGS

FIG. 3 is a diagram illustrating an example of an event log DB according to an embodiment of the present invention.

FIG. 4A to FIG. 4C are diagrams illustrating an example of a rule table according to an embodiment of the present invention.

FIG. 7 is a diagram illustrating another specific example of the GUI screen displayed on the display part in accordance with the process.

DESCRIPTION OF EMBODIMENTS

First Embodiment (System Overview)

A first embodiment of the present invention will be described in detail with reference to FIGS. 1 to 7. The first embodiment will be described, for example, by applying a configuration of an information processing device according to the present invention to an information processing system that manages a factory automation (FA) system.

Figure 2:
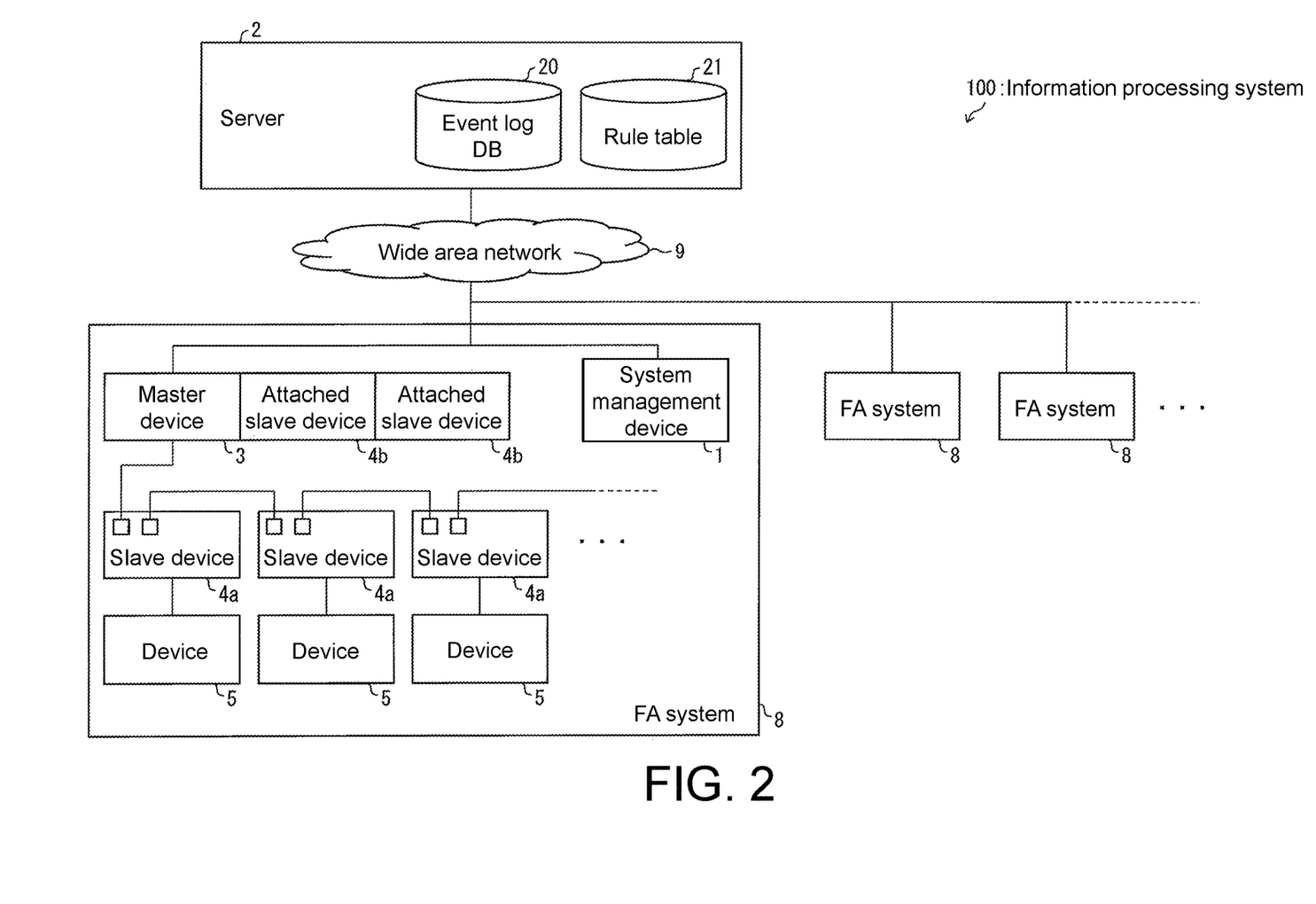
FIG. 2 is a diagram illustrating an overview of an information processing system according to an embodiment of the present invention.

FIG. 2 is a diagram illustrating an overview of an information processing system 100 according to an embodiment of the present invention. The information processing system 100 includes one or more FA systems 8 and a server 2 that generally manages the FA systems 8 by communicating with each FA system 8 via a wide area network 9.

The FA systems 8 are units in which production facilities composed of a plurality of machines installed in a factory are grouped for each function and are systems that realize automation of a factory manufacturing process. In the embodiment, for example, the FA systems 8 are realized by master-slave control systems. For example, each FA system 8 includes at least one system management device 1, a master device 3, a slave device 4, and a device 5. In the master-slave control system, data frames are sequentially transmitted to a network connecting the master device 3 to the slave device 4 so that data is transmitted and received between the devices.

The master device 3 manages data transmission with the slave device 4 via a network (for example, a local area network in the FA system 8). The master device 3 is, for example, a programmable logic controller (PLC) or the like.

The slave device 4 performs one or a plurality of functions related to a manufacturing process under the control of the master device 3. Firstly, as the slave device 4, there is a slave device 4a that communicates with the master device 3 via the network and controls driving of the device 5 under the control of the master device 3. For example, one or more slave devices 4a are daisy-chained to the master device 3 via a communication cable. Further, one or more devices 5 are connected to the slave devices 4a via communication cables. That is, the slave device 4a functions as a relay device that transmits and receives data between the master device 3 and the device 5. The slave device 4a is, for example, an ECAT slave or the like. Secondly, as the slave device 4, there is an attached slave device 4b that is attached to the master device 3 and performs a predetermined function. The attached slave device 4b is realized by, for example, a bus unit or the like.

The device 5 is a machine such as a manufacturing device or an inspection device. The device 5 may be, for example, an input device such as a sensor (a temperature sensor, an optical sensor, or the like), a switch (a push button switch, a limit switch, a pressure switch, or the like) or may be an output device such as an actuator, a relay, an electronic valve, or a display. In the FA system 8, the master device 3 performs operation control of the device 5 and reception of output data from the device 5 via the slave device 4a.

More specifically, the master device 3 acquires information from the device 5 which is an input device such as a sensor as input data and performs a calculation process using the input data from the device 5 in accordance with a user program programmed in advance. The master device 3 decides control content for the device 5 which is an output device such as an actuator based on an execution result and outputs control data corresponding to the control content to the device 5 via the slave device 4a.

The slave device 4a may function as, for example, a motor control device serving as an output unit that gives a control instruction from the master device 3 to the device 5 which is an output destination. The slave device 4a may also function as a device communication management part serving as an input unit for which the master device 3 acquires a state of the device 5 of an input source.

The network connecting the master device 3 to the slave device 4a transmits various kinds of data received by the master device 3 or various kinds of data transmitted by the master device 3. The network is, for example, EtherCAT (registered trademark), PROFINET (registered trademark), MECHATROLINK (registered trademark)-III, Powerlink, SERCOS (registered trademark)-III, CIP Motion, or the like. The network may be, for example, Ethernet/IP (registered trademark), DeviceNet, CompoNet (registered trademark), or the like.

The "master device" and the "slave device" are defined focusing on a control function of data transmission on the network connecting the master device 3 to the slave device 4 and information transmitted and received between the devices is not particularly limited.

To distinguish a network connecting the master device 3 to the slave device 4a from a network connecting the slave device 4a to the device 5, the former is referred to as an "upper-level bus (upper-level communication network)" and the latter is referred to as a "lower-level bus (lower-level communication network)."

In the FA system 8, the system management device 1 is connected via a local area network in the FA system 8. The system management device 1 can communicate with the master device 3 via the local area network. The system management device 1 is a means allowing a person to exchange information with various machines (the master device 3, the slave device 4, and the device 5) in the FA system 8. Specifically, the system management device 1 includes an input means allowing a person to operate a machine or give an instruction to a machine and an output means allowing a person to acquire a current state of the machine or a process result from the machine. The system management device 1 is, for example, a personal computer (PC) and includes, for example, a switch, a button, a handle, a dial, a pedal, a remote controller, a microphone, a keyboard, or a mouse as the input means. The system management device 1 includes, for example, a liquid crystal screen, a meter, a lamp, or a speaker as the output means.

In the embodiment, the system management device 1 has a function of presenting event logs of events occurring in various machines in the FA system 8 or a network connecting the machines in response to instructions from a user. For example, when a certain error occurs in the FA system 8, the function is used to supply information necessary to specify a true cause of the error to the user.

According to the embodiment, in the information processing system 100, the event logs collected by the master device 3 in the individual FA system 8 are aggregated to the server 2 via the wide area network 9. The server 2 aggregates the event logs received from the master device 3 of each FA system 8 to the event log database 20 (hereinafter referred to as an event log DB 20) for each FA system 8.

The system management device 1 downloads an event log of the FA system 8 that it manages from the event log DB 20 (a log storage part) of the server 2 and outputs the event log to the above-described output means (for example, a liquid crystal screen or the like), as necessary. Thus, the user can check the event log of the FA system 8 from the liquid crystal screen.

Further, the system management device 1 can extract only an event log related to a specific error occurring in the FA system 8 among a vast amount of event logs and output the event log via the output means. The system management device 1 can acquire a rule stored in the rule table 21 of the server 2 and extract a necessary event log in conformity with the rule. A function of extracting the event log according to an embodiment of the present invention will be described in detail below.

(Configuration of System Management Device)

Figure 1:
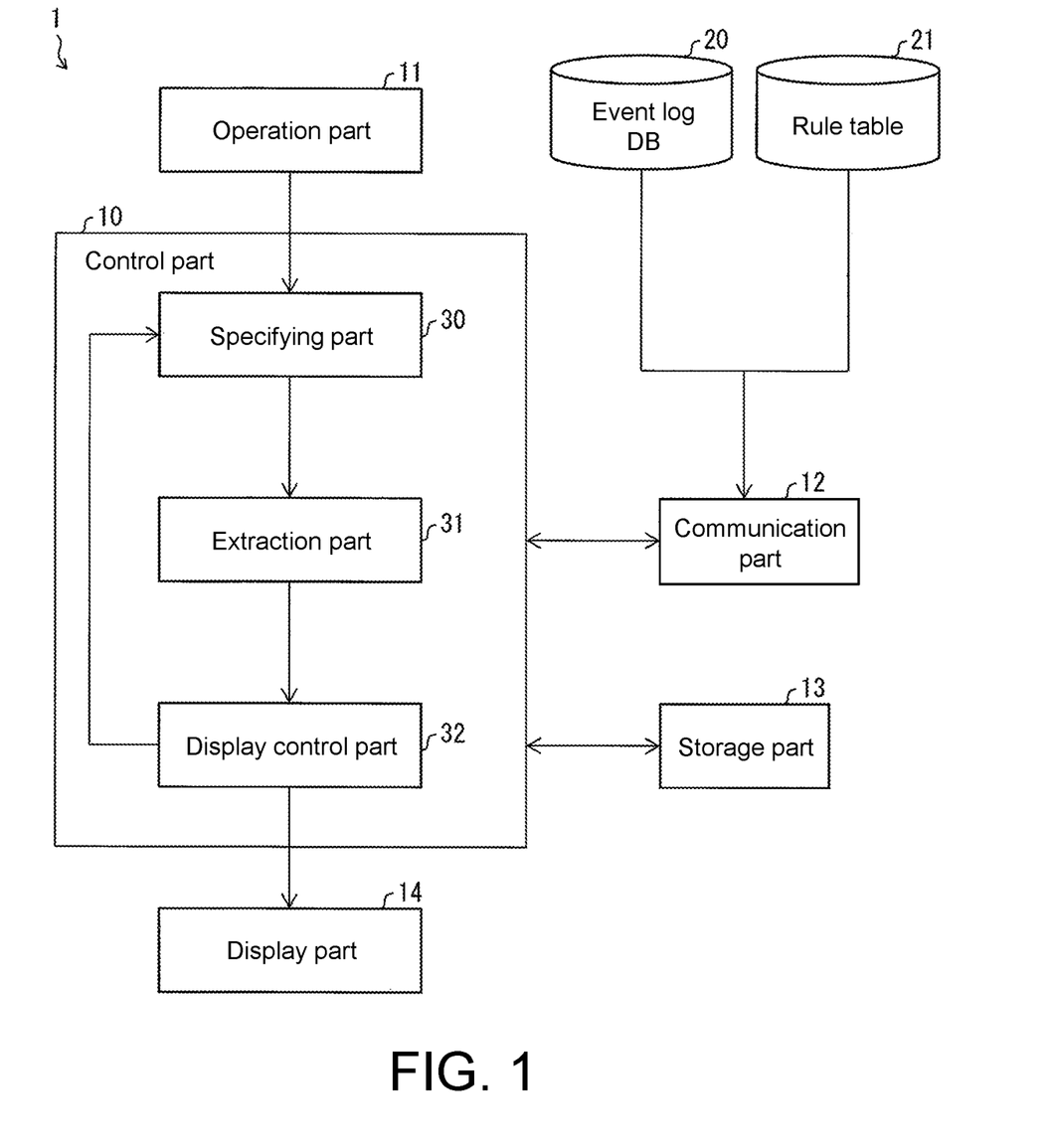
FIG. 1 is a block diagram illustrating a main part configuration of a system management device according to an embodiment of the present invention.

FIG. 1 is a block diagram illustrating a main part configuration of the system management device 1 according to an embodiment of the present invention. The system management device 1 includes a control part 10, an operation part 11, a communication part 12, a storage part 13, and a display part 14. To facilitate understanding of the present invention, other functions of a general PC which the system management device 1 has are not illustrated.

The operation part 11 is for inputting an instruction signal for the user to operate the system management device 1 and functions as the above-described input means. The operation part 11 is, for example, a keyboard, a mouse, a touch panel, or the like.

The communication part 12 communicates with an external device via a communication network that conforms to a predetermined communication scheme. The communication part 12 may have an essential function of realizing communication with an external device, and a communication line, a communication scheme, a communication medium, or the like is not limited. For example, the communication part 12 may communicate with the server 2 via the wide area network 9 or may communicate with the master device 3 via the local area network in the FA system 8.

The storage part 13 includes a nonvolatile storage device such as a read-only memory (ROM), a nonvolatile random access memory (NVRAM), or a flash memory and stores various kinds of information to be processed by the system management device 1.

The display part 14 displays information to be processed by the system management device 1, for example, a graphical user interface (GUI) screen or the like, and functions as the above-described output means. The display part 14 is realized as, for example, a display device such as a liquid crystal display (LCD). Specifically, a table of the event logs of the FA system 8 managed by the system management device 1 is displayed on the display part 14.

The control part 10 generally controls various functions that the system management device 1 has. The control part 10 includes a specifying part 30, an extraction part 31, and a display control part 32 as functional blocks. Each functional block of the above-described control part 10 can be realized, for example, when a central processing unit (CPU) or the like reads a program stored in a storage device (the storage part 13) realized by a read-only memory (ROM), a nonvolatile random access memory (NVRAM), or the like to a random access memory (RAM) (not illustrated) or the like and executes the program.

The specifying part 30 specifies condition designation event logs from the event log DB 20. The condition designation event logs indicate event logs designating a condition for extracting target event logs. In the embodiment, specifically, the condition designation event logs are an attention event log and a boundary event log.

The attention event log indicates an event log selected by the user operating the operation part 11 among the event logs displayed on the display part 14. The selection of the event log is performed, for example, when the user matches a cursor displayed on the display part 14 with an event log desired to be selected and clicks the event log. In this case, the specifying part 30 may specify the event log matched with the cursor as an attention event log when the clicking operation is input.

The boundary event log indicates an event log which separates an event log irrelevant to an attention event indicated by the attention event log and an event log which may be relevant to the attention event based on a time series. That is, the boundary event log is located in a boundary between a candidate of the relevant event log and an irrelevant event log and separates both the event logs based on a time series of an occurrence date and time. Hereinafter, an event that separates a candidate of the relevant event and the irrelevant event based on a time series of a date and time is referred to as a boundary event.

For example, when an attention event is an event related to a fault of the master device 3, an event occurring before power supply of the master device 3 can be said to be irrelevant to the attention event. Accordingly, when the attention event is an event related to the master device 3, the specifying part 30 specifies the "power supply of the master device 3" as a boundary event. Then, the specifying part 30 may specify an lastest event log indicating power supply of the master device 3 as a boundary event log by going backward from the attention event log.

A rule by which the specifying part 30 specifies the boundary event log, as described above, is stored in the rule table 21 to be described below. The specifying part 30 can acquire the rule from the rule table 21 via the communication part 12.

The extraction part 31 extracts a relevant event log indicating a relevant event related to the attention event from the event log DB 20 in accordance with a condition designated by the condition designation event log specified by the specifying part 30.

Specifically, the extraction part 31 first acquires a rule for extracting the relevant event log via the communication part 12. The rule includes information indicating relevance between events indicating which events are relevant to which events. Next, the extraction part 31 specifies the relevant events considered to be relevant to the attention event in accordance with the rule. Then, the extraction part 31 extracts event logs indicating occurrence of the specified relevant events as relevant event logs.

Further, the extraction part 31 may narrow down the extracted relevant event logs based on the boundary event log as necessary. That is, the extraction part 31 can re-extract only the relevant event logs indicating relevant events occurring after the boundary event among the extracted relevant event logs.

The extraction part 31 extracts the events occurring before the attention event as relevant events. Naturally, this is because the events occurring after the attention event are thought not to be causes of the occurrence of the attention event.

The display control part 32 causes the display part 14 to display information processed by each part included upstream in the control part 10 as a GUI screen. The display control part 32 may cause the display part 14 to display an event log of the FA system 8 managed by the own device and acquired from the event log DB 20 by the extraction part 31. Further, the display control part 32 may group the relevant event logs extracted finally by the extraction part 31 and the attention event log, and highlight these event logs separately from other event logs. For example, the display control part 32 may add the same color to the grouped event logs in display of the event logs. Further, the display control part 32 may cause a display aspect of the event logs to be different from other event logs (for example, display them with a thick frame, display them with a special color, or the like) so that locations of the event log of interest and the boundary event log specified by the specifying part 30 can be seen at a glance.

(Event Log DB)

FIG. 3 is a diagram illustrating an example of the event log DB 20. The server 2 has an event log DB for each FA system 8. FIG. 3 illustrates an example of the event log DB for one FA system 8.

In the event log DB, an event log indicating occurrence of one event includes, for example, items of "Entry No.," "date and time," "importance," "occurrence source," "occurrence source details," "event name," and "event code." "Entry No." is a unique number given sequentially in registration of the event log to the event log DB 20. "Date and time" is information indicating a date and time at which an event indicated in the event log occurs. "Importance" is information indicating severity of an error or a type of an occurring event. "Occurrence source" is information indicating a location where the event occurs. "Occurrence source details" is information for uniquely specifying a machine when the occurrence location is the machine in the FA system 8. "Event name" is information indicating a name of an occurring event. Content of the event is clearly expressed in the event name and it is desirable to use words by which the user can easily recall the content of the event. "Event code" is identification information by which each device of the information processing system 100 uniquely identifies the event.

The extraction part 31 acquires the event log DB of the FA system 8 that is managed by the own device from the event log DB 20 of the server 2. The display control part 32 causes the display part 14 to display the acquired event log DB, as illustrated in FIG. 3.

(Rule Table)

Figure 4A:
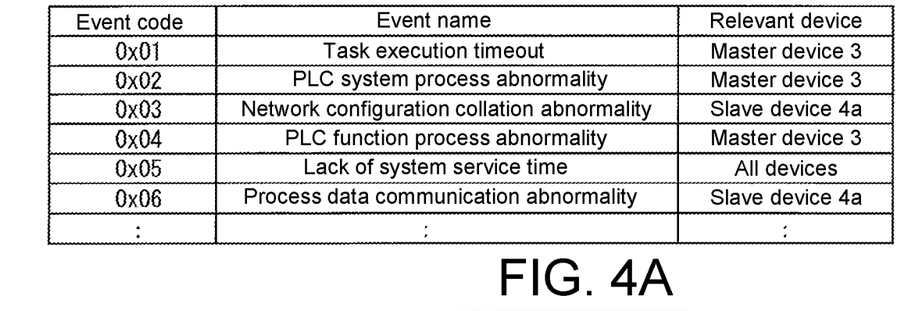
FIG. 4A illustrates a table that shows a list of predetermined events which are targets to be recorded as event logs among events occurring in an FA system.
Figure 4B:
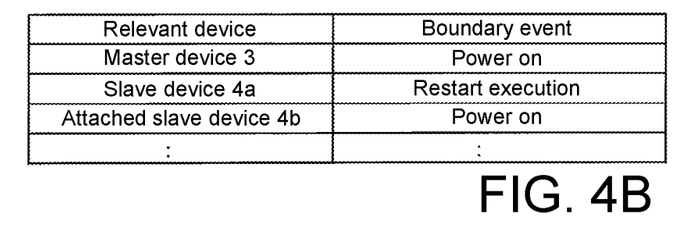
FIG. 4B illustrates a table that shows a correspondence between related devices and boundary events.
Figure 4C:
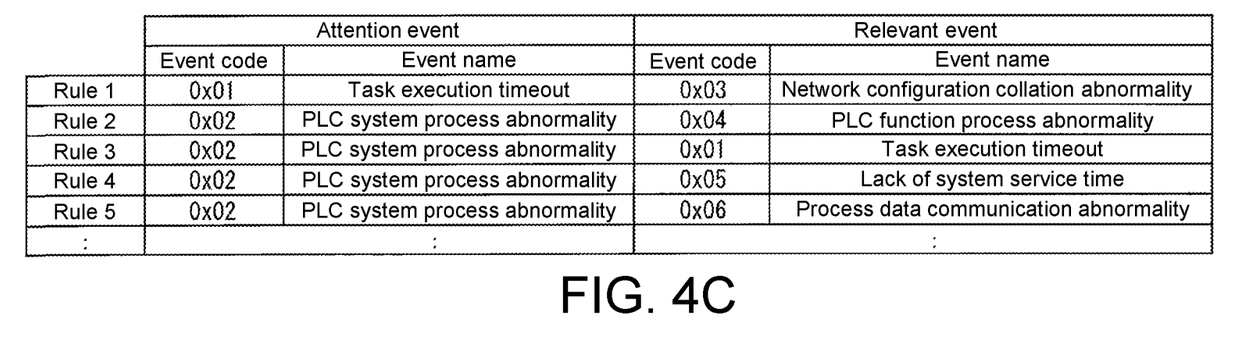
FIG. 4C illustrates a table that shows a correspondence between events of interest and related events.

FIG. 4A to FIG. 4C are diagrams is a diagram illustrating an example of the rule table 21. The rule table may be generated for each FA system 8 in response to a request of a customer owning the FA system 8 or one rule table common to all customers (the FA systems 8) may be generated.

FIG. 4A illustrates a table that shows a list of events which are targets to be recorded as event logs among events occurring in an FA system 8. The table has items of "event code," "event name," and "relevant device." "Relevant device" is information indicating a device involved closely with occurrence of the event. For example, a machine involved closely with an event of a name "task execution timeout" of event code "0x01" is particularly "master device 3" among the machines included in the FA system 8.

FIG. 4B illustrates a table that shows a correspondence between related devices and boundary events. In the table, the item of "boundary event" is associated with the item of "relevant device." The "boundary event" is information indicating which event of the relevant device involved closely with an attention event is to be used to narrow down the extraction target. For example, when the relevant device of the attention event is the master device 3, the specifying part 30 specifies a power supply event of the master device 3 as a boundary event with reference to the table illustrated in FIG. 4B. Then, the specifying part 30 specifies an event log indicating the latest power supply event of the master device 3 as a boundary event log by going backward from the attention event log. The extraction part 31 can extract relevant event logs with limitation on event logs of events occurring after a date and time of the boundary event log.

FIG. 4C illustrates a table that shows a correspondence between the events of interest and the relevant events. In the table, the item of "relevant event" is associated with the item of "attention event." The item of each event may be only "event code" or may be only "event name." A correspondence between the events of interest and the relevant events may not necessarily be one-to-one. As shown in Rules 2 to 5, a plurality of relevant events may be associated with one attention event (one-to-many). Alternatively, one relevant event may be associated with a plurality of events of interest (many-to-one).

For example, when the attention event is "task execution timeout," the extraction part 31 extracts an event of "network configuration collation abnormality" as a relevant event from the event log DB in accordance with Rule 1.

(Process Flow)

Figure 5:
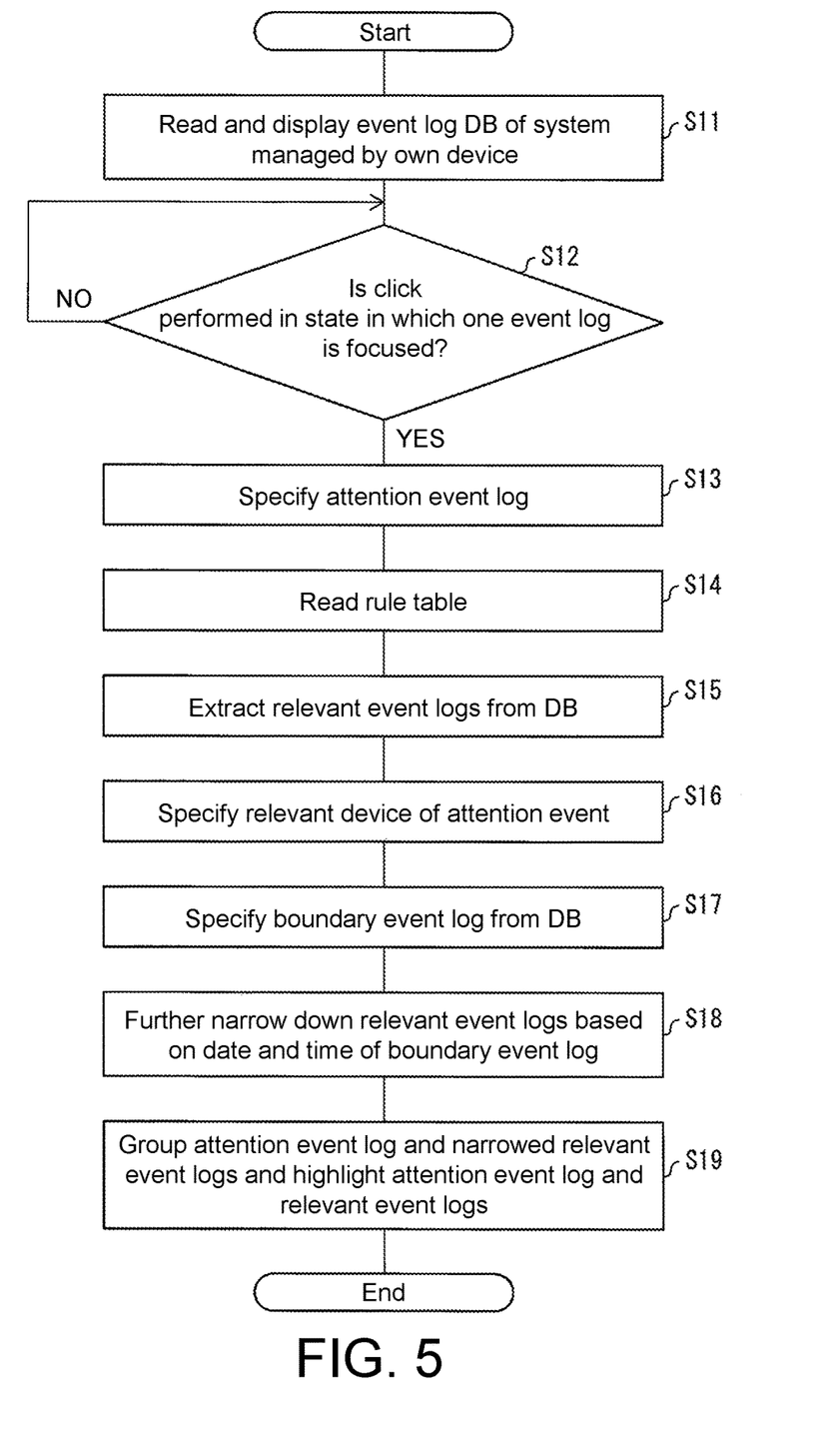
FIG. 5 is a flowchart illustrating a flow of a process of the system management device according to a first embodiment of the present invention.
Figure 6:
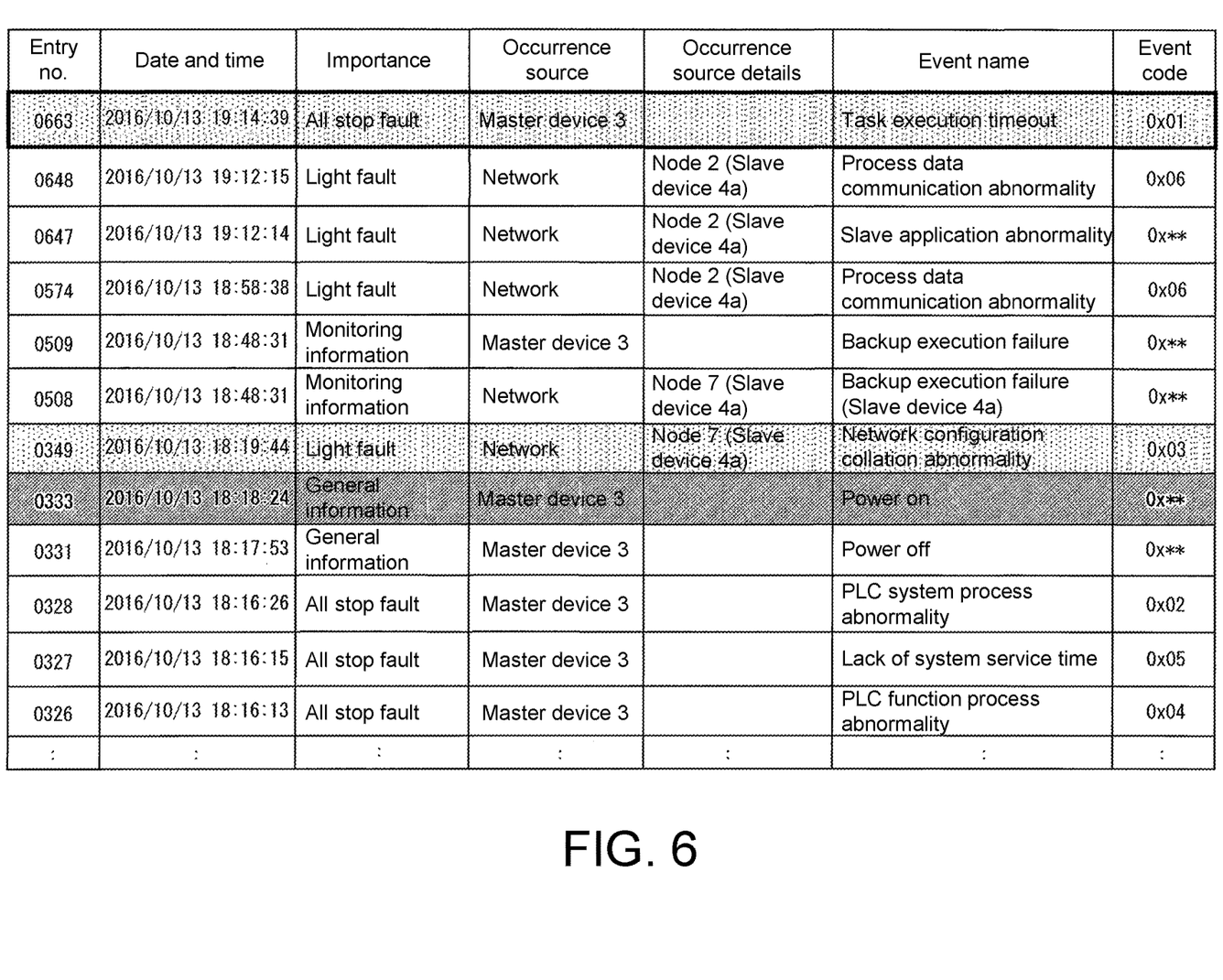
FIG. 6 is a diagram illustrating a specific example of a GUI screen displayed on a display part in accordance with the process.

FIG. 5 is a flowchart illustrating a flow of a process of the system management device 1 according to a first embodiment. FIGS. 6 and 7 are diagrams illustrating specific examples of GUI screens displayed on the display part 14 in accordance with the process.

First, when an instruction to display the event log DB of the FA system 8 is input via the operation part 11, the extraction part 31 requests the event log DB relevant to the FA system 8 managed by the own device from the server 2. The display control part 32 causes the display part 14 to display the event log DB acquired by the extraction part 31, for example, as illustrated in FIG. 3 (S11). The display control part 32 may cause a cursor to be displayed at a position of an event log which is an initial position.

When a click operation is performed via the operation part 11 in a state in which the cursor is matched with any one of the event logs illustrated in FIG. 3 (YES in S12), the specifying part 30 specifies the event log matched with the cursor as an attention event log (S13).

Subsequently, the extraction part 31 reads the table illustrated in FIG. 4C from the rule table 21 (S14). The extraction part 31 extracts relevant event logs corresponding to the attention event log specified in S13 with reference to the table from the event log DB acquired in S11 (S15).

On the other hand, the specifying part 30 acquires the table illustrated in FIG. 4A from the rule table 21 and specifies a relevant device involved closely with the attention event with reference to the table (S16). Subsequently, the specifying part 30 acquires the table as illustrated in FIG. 4B from the rule table 21 and specifies a boundary event log indicating a boundary event associated with the specified relevant device in the event log DB with reference to the table (S17).

The extraction part 31 narrows down only the relevant event logs with the dates and times after the date and time of the boundary event log specified in S17 from the relevant event logs extracted in S15 (S18). The display control part 32 groups the attention event log specified in S13 and the relevant event logs narrowed down in S18, and highlights the event logs separately from the other event logs (S19). For example, the display control part 32 may give a color common to only the attention event log and the relevant event log.

FIG. 6 illustrates an example of a GUI screen displayed on the display part 14 when the record of Entry No. "0663" is an attention event log. When the record of "0663" is clicked, the specifying part 30 specifies the attention event, "task execution timeout." The extraction part 31 extracts a relevant event log indicating "network configuration collation abnormality" from the event log DB based on Rule 1 illustrated in FIG. 4C. In the example illustrated in FIG. 3, the records of Entry No. "0349", Entry No. "0320", Entry No. "0252", and Entry No. "0248" are extracted.

The specifying part 30 specifies a boundary event corresponding to the foregoing attention event as "power supply of master device 3" based on each of the tables illustrated in FIG. 4A and FIG. 4B. The specifying part 30 goes backward from the attention event log "0663" and specifies the event log (Entry No. "0333") indicating the latest "power supply of the master device 3" event as a boundary event log. The event log occurring after the date and time of the boundary event log of "0333" is only the record of Entry No. "0349" among the previously extracted relevant event logs (Entry No. "0349", Entry No. "0320", Entry No. "0252", and Entry No. "0248"). Thus, the extraction part 31 outputs the narrowed result (the record of Entry No. "0349") to the display control part 32.

The display control part 32 groups the attention event log of Entry No. "0663" and the relevant event log of Entry No. "0349", adds a specific color to the event logs, and causes the display part 14 to display the event logs (see FIG. 6). Further, the display control part 32 may match a thick frame (cursor) indicating that the record of Entry No. "0663" is the attention event log with the event log for display. Further, the display control part 32 may cause a display aspect of the boundary event log to be different from that of the other event logs in order to indicate that the record of Entry No. "0333" is the boundary event log. In the example illustrated in FIG. 6, the display control part 32 further causes the boundary event log to be displayed with another color. As illustrated in FIG. 6, when the event logs are sorted and displayed in descending order of the dates and times, it can be understood that the relevant event log is located between the attention event log and the boundary event log.

FIG. 7 illustrates an example of the GUI screen displayed on the display part 14 when the record of Entry No. "0328" is an attention event log. When the record of "0328" is clicked, the specifying part 30 specifies the attention event as "PLC system process abnormality" and specifies the boundary event as "power supply of master device 3". The extraction part 31 extracts relevant events located between the attention event log "0328" and the boundary event log "0254" by Rules 2 and 5. Specifically, the records of Entry No. "0255", Entry No. "0325", Entry No. "0326", and Entry No. "0327" are extracted. The display control part 32 groups the attention event log of Entry No. "0328" and the relevant event logs of Entry No. "0255", Entry No. "0325", Entry No. "0326", and Entry No. "0327", adds a specific color to the event logs, and causes the display part 14 to display the event logs (see FIG. 7).

According to the above-described configuration and method, the user can understand that the relevant event logs to which the same color as that of the attention event log is added may be first checked at a glance among the event logs between the boundary event log and the attention event log. Further, when colors of the event logs are classified by group, the user can understand at a glance that the relevant events (for example, the event log of Entry No. "0255" or the like in FIG. 7) separated from the attention event log is related. That is, the user can specify the relevant events related to an attention event (a failure event) easily in a short time among the vast amount of event logs even when the user is an unskilled person. In particular, in the master-slave control system, since the lower-level slave devices 4 and devices 5 and all the events regarding the network connecting the devices are collected by the upper-level master device 3, the number of event logs becomes vast. Therefore, the effect obtained by applying the above-described configuration and method to the master-slave control system is considerable.

Second Embodiment

A second embodiment of the present invention will be described in detail with reference to FIGS. 8 and 9. The same reference signs are given to the same or equivalent portions in the drawings and the description thereof will not be repeated. In the second embodiment, the system management device 1 extracts relevant events focusing on a date and time at which an attention event occurs.

Figure 8:
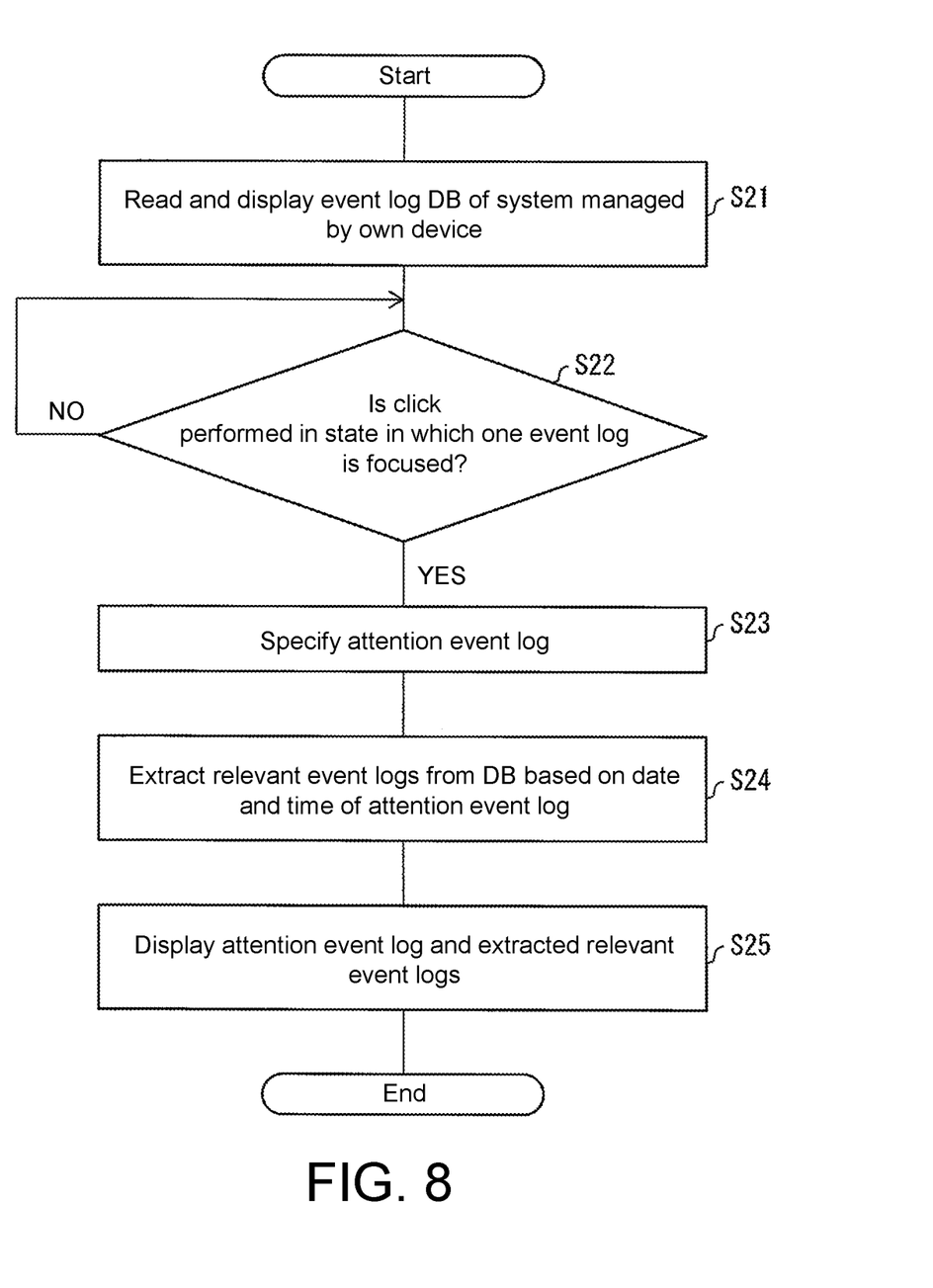
FIG. 8 is a flowchart illustrating a flow of a process of a system management device according to a second embodiment of the present invention.

FIG. 8 is a flowchart illustrating a flow of a process of a system management device 1 according to the second embodiment. FIG. 9 is a diagram illustrating a specific example of a GUI screen displayed on the display part 14 in accordance with the process.

S21 to S23 are similar to S11 to S13 of the first embodiment. Subsequently, the extraction part 31 refers to a date and time of the attention event log specified in S23, and extracts event logs of events occurring in a short time around the date and time (S24). For example, the extraction part 31 may extract the event logs of the events occurring within 1 minute before and after the date and time of the attention event log. Alternatively, the threshold is not limited to "within 1 minute before and after" the date and time and may be, for example, "within 1 second before and after" the date and time. As the threshold, an appropriate value is set in accordance with a property of an event desired to be extracted.

The display control part 32 groups the attention event log specified in S23 and the relevant event logs extracted in S24 and displays the event logs to be separated from the other event logs (S25). For example, the display control part 32 may cause the display part 14 to display only the grouped event logs.

Figure 9:
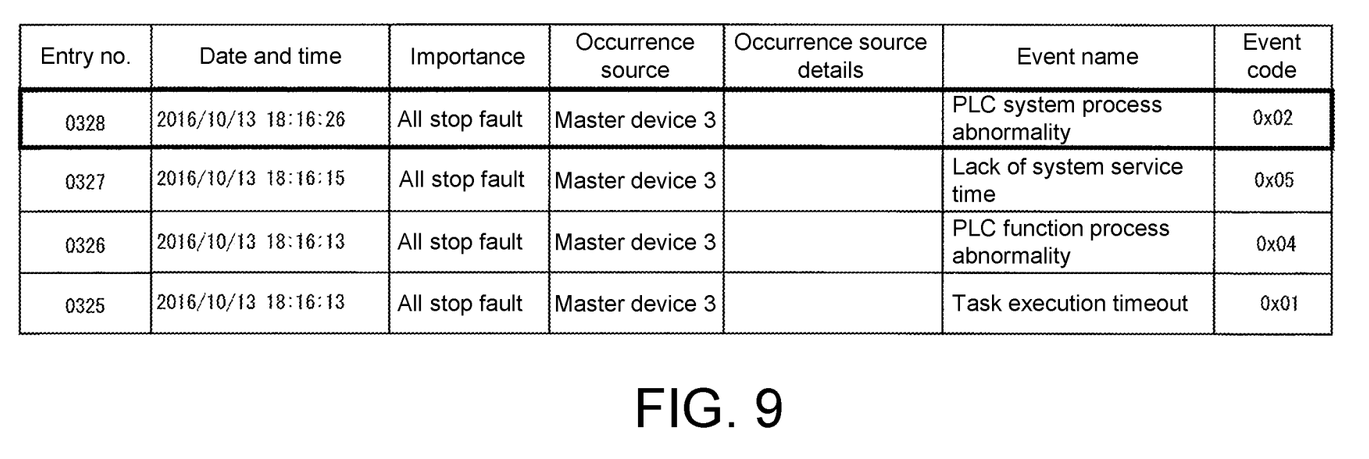
FIG. 9 is a diagram illustrating a specific example of a GUI screen displayed on a display part in accordance with the process.

FIG. 9 illustrates an example of a GUI screen displayed on the display part 14 when the record of Entry No. "0328" is an attention event log. When the record of Entry No. "0328" is clicked, the extraction part 31 extracts event logs of the events occurring within 1 minute before and after the date and time "2016/10.13 18:16:26" of the record as relevant event logs. Specifically, the records of Entry No. "0325", Entry No. "0326", and Entry No. "0327" are extracted. The display control part 32 groups the attention event log of Entry No. "0328" and the relevant event logs of Entry No. "0325", Entry No. "0326", and Entry No. "0327" and causes the display part 14 to display the event logs (see FIG. 9).

According to the above-described configuration and method, the user can obtain a list in which only the events occurring in a short time (for example, for 1 minute before and after the date and time at which the attention event occurs) are enumerated. There is a high possibility of each of the events collectively occurring in a short time being related to each other based on one true cause. Accordingly, the user can specify the relevant events related to the attention event (the failure event) easily and in a short time among the vast amount of event logs even when the user is an unskilled person.

Modification Examples

The information processing system 100 may include a human machine interface (HMI) in the FA system 8. The HMI is a user interface used for the user to control an operation of the master device 3 and is realized with, for example, a touch panel. The HMI (information processing device) may be connected to the master device 3 via, for example, a universal serial bus (USB) cable. Alternatively, the HMI may be connected to the master device 3 via a local area network in the FA system 8 as in the system management device 1.

One of the system management device 1, the server 2, the master device 3, and the foregoing HMI may function as an information processing device according to the present invention. Alternatively, at least a plurality of the system management device 1, the server 2, the master device 3, and the HMI may function as the information processing device according to the present invention. That is, the event log DB 20, the rule table 21, the specifying part 30, the extraction part 31, and the display control part 32 included in the information processing device according to the present invention may be installed in any one of the system management device 1, the server 2, the master device 3, and the HMI.

Specifically, the rule table 21 may be retained by the master device 3 or the HMI or may be stored in the storage part 13 by the system management device 1.

The event log DB 20 may be retained by the master device 3. Alternatively, the system management device 1 may periodically inquire the master device 3 or the server 2 via the local area network and always store the latest event log DB 20 in the storage part 13. Alternatively, the HMI may be configured to read the event log DB 20 from the master device 3 as necessary. In either case, the event log DB 20 is an event log DB regarding one FA system 8 managed by the system management device 1.

The specifying part 30 may be included in the server 2, may be included in the master device 3, or may be included in the HMI. The extraction part 31 may be included in the server 2, may be included in the master device 3, or may be included in the HMI. The specifying part 30 and the extraction part 31 may be included in the same device or may be included in different devices.

For example, when the specifying part 30 and the extraction part 31 are included in the server 2, the control part 10 of the system management device 1 or the HMI transmits a request to the server 2 in response to a click operation received via the operation part 11. The request is used to request an extraction result using the selected event log as a query from the server 2. When the specifying part 30 and the extraction part 31 of the server 2 execute the method described in the first or second embodiment, relevant event logs are extracted. The display control part 32 of the system management device 1 or the HMI receives the extracted relevant event logs as a response from the server 2 and causes the display part 14 to emphasize and display the relevant event logs.

[Implementation Example by Software]

A control block (in particular, the specifying part 30, the extraction part 31, and the display control part 32) of the system management device 1 may be implemented by a logic circuit (hardware) formed with an integrated circuit (IC chip) or the like or may be implemented by software using a central processing unit (CPU).

In the latter case, the system management device 1 includes a CPU that executes instructions of a program which is software implementing each function, a read-only memory (ROM) or a storage device (which is referred to as a "recording medium") on which the program and various kinds of data can be recorded to be readable by a computer (or a CPU), and a random access memory (RAM) on which the program is loaded. Then, when the computer (or the CPU) reads the program from the recording medium and executes the program, an object of the present invention is achieved. As the recording medium, a "non-transitory medium", for example, a tape, a disc, a card, a semiconductor memory, a programmable logic circuit, or the like can be used. The program may be supplied to the computer via any transmission medium (a communication network, broadcast waves, or the like) capable of transmitting the program. An aspect of the present invention can also be realized in the form of a data signal embedded in carrier waves in which the program is embodied by electronic transmission.

To solve the foregoing problem, according to an aspect of the present invention, there is provided an information processing device which processes an event log for recording a predetermined event occurring in a master-slave control system and collected by a master device in which the event log includes at least information indicating content of the occurring event and is stored in a log storage part for each event. The information processing device includes: a display control part configured to cause a display part to display one or more of the event logs; a specifying part configured to specify an event log designated by a user via an operation part among the displayed event logs as an attention event log; and an extraction part configured to specify a relevant event relevant to an attention event recorded in the attention event log based on a predetermined rule and extract a relevant event log in which occurrence of the relevant event is recorded from the log storage part. The display control part causes the display part to display the attention event log and the extracted relevant event log.

In the foregoing configuration, when one event log in which the user is interested is selected by the user, the event logs relevant to the event log are extracted based on a predetermined rule. The attention event log in which the user is interested and the extracted relevant event log are displayed on the display part.

Accordingly, the user can distinguish the attention event log and the relevant event logs from other event logs and recognize the attention event log and the relevant event logs at a glance. As a result, it is possible to obtain the effect that even an unskilled person can specify the relevant events from the collected event logs easily and in a short time.

In the information processing device according to the aspect of the present invention, the extraction part specifies a relevant event relevant to the specified attention event based on a predetermined correspondence and extracts a relevant event log of the relevant event from the log storage part. The display control part causes the attention event log and the extracted relevant event log to be displayed in a display aspect different from other event logs.

Accordingly, the user can distinguish the attention event log and the relevant event logs that have the correspondence with the attention event from other event logs and recognize the attention event log and the relevant event logs at a glance. As a result, it is possible to obtain the effect that even an unskilled person can specify the relevant events from the collected event logs easily and in a short time.

In the information processing device according to the aspect of the present invention, the event log includes information indicating a date and time at which an event occurs. The specifying part further may specify a boundary event log separating a candidate for the relevant event log and an irrelevant event log based on a time series of the date and time. The extraction part may extract a relevant event log in which a date and time is recorded after a data and time at which the boundary event log is recorded before the date and time at which the attention event log is recorded from the log storage part.

In the information processing device according to the aspect of the present invention, the specifying part may specify a relevant device of the attention event based on a predetermined correspondence with relevant device involved with occurrence of the attention event and the attention event. Based on a correspondence between a predetermined relevant device and the boundary event, the specifying part may specify a boundary event separating a candidate for a relevant event and an irrelevant event based on the time series of the date and time among the events occurring with regard to the specified relevant device. The specifying part may specify an event log in which the specified boundary event is recorded as the boundary event log.

In the foregoing configuration, an event log in which an event irrelevant to an attention event is recorded (an irrelevant event log) can be excluded from an extraction set based on a date and time of a boundary event log. Specifically, an irrelevant event log before the date and time of the boundary event log can be excluded. Further, based on the date and time of the attention event, the irrelevant event log can be excluded from the extraction set. Specifically, an irrelevant event log after the data and time of the attention event log can be excluded.

Thus, an event completely irrelevant to an event in which the user is interested is excluded from the extraction set and only an event really relevant to the attention event is supplied as a relevant event log to the user. As a result, it is possible to obtain the effect that even an unskilled person can specify the relevant event from the collected event log easily and in a short time.

In the information processing device according to the aspect of the present invention, the display control part may cause the attention event log and the extracted relevant log to be displayed in a color different from other event logs.

Accordingly, the user can distinguish the attention event log and the relevant event logs from other event logs and recognize the attention event log and the relevant event logs at a glance. As a result, it is possible to obtain the effect that even an unskilled person can specify the relevant events from the collected event logs easily and in a short time.

In the information processing device according to the aspect of the present invention, the event log may further include information indicating a date and time at which the event occurs. The extraction part may extract an event log of which a data and time included in the event log is within a predetermined time before and after a date and time of the attention event log, as a relevant event log. The display control part may cause the display part to display the attention event log and the extracted relevant event log excluding other event logs.

In the foregoing configuration, when one event log in which the user is interested is selected by the user, the event logs of the events occurring within a predetermined time before and after the date and time of the event log are extracted as the relevant event logs. The events that occur together in a short time are likely to be related to each other. Only the attention event log in which the user is interested and the relevant event log of the event occurring at a close timing are displayed on the display part.

Accordingly, the user can distinguish the attention event log and the relevant event logs occurring at a close timing from the other event logs and recognize the attention event log and the relevant event logs at a glance. As a result, it is possible to obtain the effect that even an unskilled person can specify the relevant events from the collected event logs easily and in a short time.

To solve the foregoing problem, according to another aspect of the present invention, there is provided a method of controlling an information processing device which processes an event log for recording a predetermined event occurring in a master-slave control system and collected by a master device, in which the event log includes at least information indicating content of the occurring event and is stored in a log storage part for each event, and the information processing device includes a display part and an operation part. The method includes: a first display control step of causing the display part to display one or more of the event logs; a specifying step of specifying an event log designated by a user via an operation part among the displayed event logs as an attention event log; an extraction step of specifying a relevant event relevant to an attention event recorded in the attention event log based on a predetermined rule and extracting a relevant event log in which occurrence of the relevant event is recorded from the log storage part; and a second display control step of causing the display part to display the attention event log and the extracted relevant event log.

The information processing device according to each aspect of the present invention may be realized by a computer. In this case, a control program for the information processing device causing a computer to be realized as the information processing device by causing the computer to operate as each part (software components, for example, the display control part, the specifying part, and the extraction part) included in the information processing device and a computer-readable recording medium that records the control program also fall within the scope of the present invention.

The present invention is not limited to each of the above-described embodiments and can be modified in various forms within the scope of the claims, and embodiments obtained by appropriately combining the technical means disclosed in other embodiments are included in technical scope of the present invention.

The invention claimed is:

1. An information processing device which processes an event log for recording a predetermined event occurring in a master-slave control system and collected by a master device, in which the event log at least comprises information indicating content of the predetermined event and is stored in a log storage part for each event, the information processing device comprising:
   a display control part configured to cause a display part to display one or more event logs;
   a specifying part configured to specify an event log designated by a user via an operation part among the displayed event logs as an attention event log; and
   an extraction part configured to specify a relevant event relevant to an attention event recorded in the attention event log based on a predetermined rule and extract a relevant event log in which occurrence of the relevant event is recorded from the log storage part,
   wherein the display control part causes the display part to display the attention event log and the extracted relevant event log,
   wherein the event log comprises information indicating a date and time at which an event occurs,
   wherein the specifying part further specifies a boundary event log separating a candidate for the relevant event log and an irrelevant event log based on a time series of the date and time, and
   wherein the extraction part extracts a relevant event log in which a date and time is recorded after a date and time at which the boundary event log is recorded and before the date and time at which the attention event log is recorded from the log storage part.

2. The information processing device according to claim 1,
   wherein the extraction part specifies a relevant event relevant to the specified attention event based on a predetermined correspondence and extracts a relevant event log of the relevant event from the log storage part, and
   wherein the display control part displays the attention event log and the extracted relevant event log in a display manner different from other event logs.

3. The information processing device according to claim 2, wherein the display control part causes the attention event log and the extracted relevant log to be displayed in a color different from the other event logs.

4. The information processing device according to claim 1,
   wherein the specifying part specifies a relevant device of the attention event based on a predetermined correspondence with a relevant device involved with occurrence of the attention event and the attention event,
   wherein, based on a correspondence between a predetermined relevant device and the boundary event, the specifying part specifies a boundary event separating a candidate for a relevant event and an irrelevant event based on the time series of the date and time among events occurring with regard to the specified relevant device, and
   wherein the specifying part specifies an event log in which the specified boundary event is recorded as the boundary event log.

5. The information processing device according to claim 4, wherein the display control part causes the attention event log and the extracted relevant log to be displayed in a color different from the other event logs.

6. The information processing device according to claim 1, wherein the display control part causes the attention event log and the extracted relevant event log to be displayed in a color different from the other event logs.

7. A non-transitory recording medium storing a control program causing a computer to function as the information processing device according to claim 1, the control program causing the computer to function as the display control part, the specifying part, and the extraction part.

8. An information processing device which processes an event log for recording a predetermined event occurring in a master-slave control system and collected by a master device, in which the event log at least comprises information indicating content of the predetermined event and is stored in a log storage part for each event, the information processing device comprising:
   a display control part configured to cause a display part to display one or more event logs;
   a specifying part configured to specify an event log designated by a user via an operation part among the displayed event logs as an attention event log; and
   an extraction part configured to specify a relevant event relevant to an attention event recorded in the attention event log based on a predetermined rule and extract a relevant event log in which occurrence of the relevant event is recorded from the log storage part,
   wherein the display control part causes the display part to display the attention event log and the extracted relevant event log,
   wherein the event log further comprises information indicating a date and time at which the event occurs,
   wherein the extraction part extracts an event log of which a date and time included in the event log is within a predetermined time before and after a date and time of the attention event log, as a relevant event log, and
   wherein the display control part causes the display part to display the attention event log and the extracted relevant event log excluding other event logs.

9. A method of controlling an information processing device which processes an event log for recording a predetermined event occurring in a master-slave control system and collected by a master device, in which the event log at least comprises information indicating content of the predetermined event and is stored in a log storage part for each event, and the information processing device comprises a display part and an operation part, the method comprising:
   a first display control step of causing the display part to display one or more event logs;
   a specifying step of specifying an event log designated by a user via the operation part among the displayed event logs as an attention event log;
   an extraction step of specifying a relevant event relevant to an attention event recorded in the attention event log based on a predetermined rule and extracting a relevant event log in which occurrence of the relevant event is recorded from the log storage part; and
   a second display control step of causing the display part to display the attention event log and the extracted relevant event log,
   wherein the event log comprises information indicating a date and time at which an event occurs,
   wherein the specifying step further specifies a boundary event log separating a candidate for the relevant event log and an irrelevant event log based on a time series of the date and time, and
   wherein the extraction step extracts a relevant event log in which a date and time is recorded after a date and time at which the boundary event log is recorded and before a date and time at which the attention event log is recorded from the log storage part.

\* \* \* \* \*